US012783336B2

(12) United States Patent
Crasta et al.

(10) Patent No.: US 12,783,336 B2
(45) Date of Patent: Nov. 3, 2026

(54) AUTO-SCALING, RESILIENT, AND LOAD BALANCING FRAMEWORK FOR WORKLOAD DEPLOYMENT IN CLOUD AND HIGH PERFORMANCE COMPUTING ENVIRONMENTS

(71) Applicant: Hewlett Packard Enterprise Development LP, Spring, TX (US)

(72) Inventors: Clarete Riana Crasta, Bangalore (IN); Ramesh Chandra Chaurasiya, Bangalore (IN); Krishnaprasad Lingadahalli Shastry, Bangalore (IN); Sharad Singhal, Belmont, CA (US); David R. Emberson, Santa Cruz, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 163 days.

(21) Appl. No.: 18/735,809

(22) Filed: Jun. 6, 2024

(65) Prior Publication Data

US 2025/0291667 A1 Sep. 18, 2025

(30) Foreign Application Priority Data

Mar. 18, 2024 (IN) ............................ 202411020139

(51) Int. Cl.

*G06F 11/20* (2006.01)
*G06F 9/50* (2006.01)
*G06F 11/07* (2006.01)

(52) U.S. Cl.

CPC ........ *G06F 11/0784* (2013.01); *G06F 9/5066* (2013.01); *G06F 9/5083* (2013.01);

(Continued)

(58) Field of Classification Search

CPC .... G06F 11/20; G06F 11/2025; G06F 11/203; G06F 9/5083; G06F 9/5088; G06F 9/5066; G06F 9/5027

See application file for complete search history.

(56) References Cited

U.S. PATENT DOCUMENTS

| | | | |
|---|---|---|---|
| 7,277,984 | B2 | 10/2007 | Ghosal et al. |
| 8,732,310 | B2 | 5/2014 | Breitgand et al. |

(Continued)

OTHER PUBLICATIONS

"2025-CUG-DELEGATE-BOOK", available online at <https://cug.org/wp-content/uploads/2025/05/2025-CUG-DELEGATE-BOOK.pdf< 66 pages.

(Continued)

*Primary Examiner* — Yolanda L Wilson
(74) *Attorney, Agent, or Firm* — Slater Matsil, LLP

(57) ABSTRACT

In certain embodiments, a method includes receiving, at a framework daemon, an indication to begin execution of a workload divided into execution units; accessing, by the framework daemon and in response to the indication, an execution context that includes the execution units; associating, by the framework daemon, an identifier of a node with an execution unit of the execution units to claim the execution unit for execution by the node; executing, by the node, the execution unit; accessing, by the framework daemon and after the node completes execution of the execution unit, the execution context to determine whether the execution context includes an unclaimed execution unit; associating, by the framework daemon and when the execution context includes an unclaimed execution unit, the identifier of the node with the unclaimed execution unit to claim the unclaimed execution unit for execution by the node; and executing, by the node, the execution unit.

20 Claims, 6 Drawing Sheets

(52) U.S. Cl.
CPC ...... *G06F 11/0724* (2013.01); *G06F 11/0751* (2013.01); *G06F 11/20* (2013.01)

(56) References Cited

U.S. PATENT DOCUMENTS

| | | | | |
|---|---|---|---|---|
| 9,141,435 | B2 | 9/2015 | Wein | |
| 9,245,246 | B2 | 1/2016 | Breitgand et al. | |
| 9,514,165 | B2 | 12/2016 | George et al. | |
| 10,585,825 | B2 | 3/2020 | Desai et al. | |
| 10,791,168 | B1 | 9/2020 | Dilley et al. | |
| 11,526,385 | B1 * | 12/2022 | Mannar | G06F 9/542 |
| 2019/0302861 | A1 | 10/2019 | Desai et al. | |
| 2020/0026563 | A1 * | 1/2020 | Bahramshahry | G06F 9/4887 |
| 2020/0026624 | A1 * | 1/2020 | Parthasarathy | G06F 11/2025 |
| 2020/0136943 | A1 | 4/2020 | Banyai et al. | |
| 2021/0357263 | A1 * | 11/2021 | Cruanes | G06F 9/5083 |
| 2022/0094690 | A1 | 3/2022 | Tarkhanyan et al. | |
| 2024/0111606 | A1 * | 4/2024 | Chanler | G06F 9/5083 |

OTHER PUBLICATIONS

"Ehcache Documentation", available online at <https://web.archive.org/web/20240730182344/https://www.ehcache.org/documentation/>, July 300, 2024, 3 pages.
Arpaci-Dusseau, "The Andrew File System (AFS)", Operating Systems [Version 1.10], 2008-23, 14 pages.
Gala et al., "Management of Multilevel, Multiclient Cache Hierarchies with Application Hints", ACM Transactions on Computer Systems (TOCS), vol. 29, Issue 2 Article No. 5, 2011, 52 pages.
Github, "daos-stack / daos", available online at <https://web.archive.org/web/20240217081407/http://github.com/daos-stack/daos>, Feb. 17, 2024, 3 pages/.
Github, "OpenFAM / OpenFAM", available online at <https://github.com/OpenFAM/OpenFAM/releases/tag/v3.0.0>, Feb. 1, 2023, 2 pages.
Github, "OpenFAM", available online at <https://web.archive.org/web/20240811135858/https://github.com/OpenFAM>, Aug. 11, 2024, 2 pages.
Jeffrey C. Mogul "Recovery in Spritely NFS", The USENIX Association, computing systems, vol. 7 . No. 2 . spring 1994, 63 pages.
K. Harms, "DAOS is your Future Distributed Asynchronous Object Store, "available online at < https://www.alcf.anl.gov/sites/default/files/2023-10/DAOS-ALCF-HoW23.pdf>, Oct. 10-12, 2023, 17 pages.
M. Hennecke, "Understanding DAOS Storage Performance Scalability," in Proceedings of the HPC Asia 2023 Workshops, RaUles Blvd Singapore: ACM, Feb. 2023, pp. 1-14.
Moritz et al., "Ray: A Distributed Framework for Emerging AI Applications", Sep. 30, 2018, 17 pages.
Ousterhout et al., "The RAMCloud Storage System", ACMTransactions on Computer Systems, vol. 33, No. 3, Article 7, Publication date: Aug. 2015, 55 pages.
Petros Koutoupis, "The Lustre Distributed Filesystem", available online at <https://dl.acm.org/doi/fullHtml/10.5555/2062736.2062739>, 2011, 3pages.
Qian et al., "LPCC: hierarchical persistent client caching for lustre" DataDirect Networks, 2016, 28 pages.
Qian et al., "Lustre Metadata Writeback Cache", 2023, 30 pages.
Redis, "Client-side caching reference", available online at <https://web.archive.org/web/20241001000827/https:/redis.io/docs/latest/develop/reference/client-side-caching/>, Oct. 1, 2024, 12 pages.
Redis, "Redis Cache_ In-Memory Caching Solutions - Redis Enterprise", available online at <https://web.archive.org/web/20240409124118/https://redis.io/solutions/caching/>, Jul. 2024, 8 pages.
Singhal et al., "OpenFAM: Programming disaggregated memory", Sep. May 2-5, 2022, 13 pages.
Srinivasan et al., "Spritely NFS: Experiments with Cache-Consistency Protocols ", 1989, ACM, 13 pages.
Strati et al., "Orion: Interference-aware, Fine-grained GPU Sharing for ML Applications", ACM, 2024, 18 pages.
Tang et al., "Toward Scalable and Asynchronous Object-Centric Data Management for HPC," 2018 18th IEEE/ACM International Symposium on Cluster, Cloud and Grid Computing (CCGRID), 10 pages.
Thomson Reuters, "Whitepaper", available online at <https://www.thomsonreuters.com/content/dam/openweb/documents/pdf/tr-com-financial/white-paper/keybridge-sbdi-whitepaper.pdf>, May 2013, 9 pages.
WEKA "WEKA Data Platform Architecture", Feb. 2025, 40 Pages.
WEKA, "NeuralMesh by WEKA Architecture Whitepaper—WEKA", available online at <https://www.weka.io/resources/white-paper/wekaio-architectural-whitepaper/>, 5, 49 pages.
Zhang et al., "Optimizing Data Movement for GPU-Based In-Situ Workflow Using GPUDirect RDMA", In Euro-Par 2023: Parallel Processing: 29th International Conference on Parallel and Distributed Computing, 2023, 15 pages.
"Moab HPC Suite",, available online at <https://adaptivecomputing.com/cherry-services/videos-demos/>, 2024, 4 pages.
"Open MPI v4.1.6 documentation", available online at <https://www.open-mpi.org/doc/current/>, 2024, 3 pages.
"OPENMP", available online at <https://www.openmp.org/>, 2023, 4 pages.
"Slurm Power Saving Guide", available online at <https://slurm.schedmd.com/power_save.html>, Feb. 2, 2024, 1 page.
"Slurm Workload Manager—Documentation", available online at <https://slurm.schedmd.com/documentation.html>, Mar. 13, 2024, 4 pages.
Altair, "Altair® PBS Professional®", available online at <https://altair.com/pbs-professional>, 2024, 7 pages.
AWS, "Amazon EC2", available online at <https://aws.amazon.com/ec2/>, 2024, 1 page.
Castain et al., "PMIx: Process Management for Exascale Environments", EuroMPI/USA'17, Sep. 25-28, 11 pages.
Github, "SchedMDslurm Public", available onlne at <https://github.com/SchedMD/slurm/blob/master/src/slurmctld/ping_nodes.c#L369>, reterieved in Jun. 16, 2024, 13 pages.
Zhang et al., "A UPC runtime system based on MPI and POSIX threads", 14th Euromicro International Conference on Parallel, Distributed, and Network-Based Processing (PDP'06), Feb. 15-17, 2006, 8 pages.

* cited by examiner

AUTO-SCALING, RESILIENT, AND LOAD BALANCING FRAMEWORK FOR WORKLOAD DEPLOYMENT IN CLOUD AND HIGH PERFORMANCE COMPUTING ENVIRONMENTS

GOVERNMENT SUPPORT STATEMENT

This invention was made with Government support under Contract Number H98230-15-D-0022/0003 awarded by the Maryland Procurement Office. The Government has certain rights in this invention.

BACKGROUND

Workloads are often executed using more than one node in computing environments. In such scenarios, a workload manager may allocate a number of nodes for executing the workload, and assign portions of the workload to each of the allocated nodes.

BRIEF DESCRIPTION OF THE DRAWINGS

Certain examples discussed herein will be described with reference to the accompanying drawings listed below. However, the accompanying drawings illustrate only certain aspects or implementations of examples described herein by way of example, and are not meant to limit the scope of the claims.

DETAILED DESCRIPTION OF ILLUSTRATIVE EXAMPLES

Figure 1:
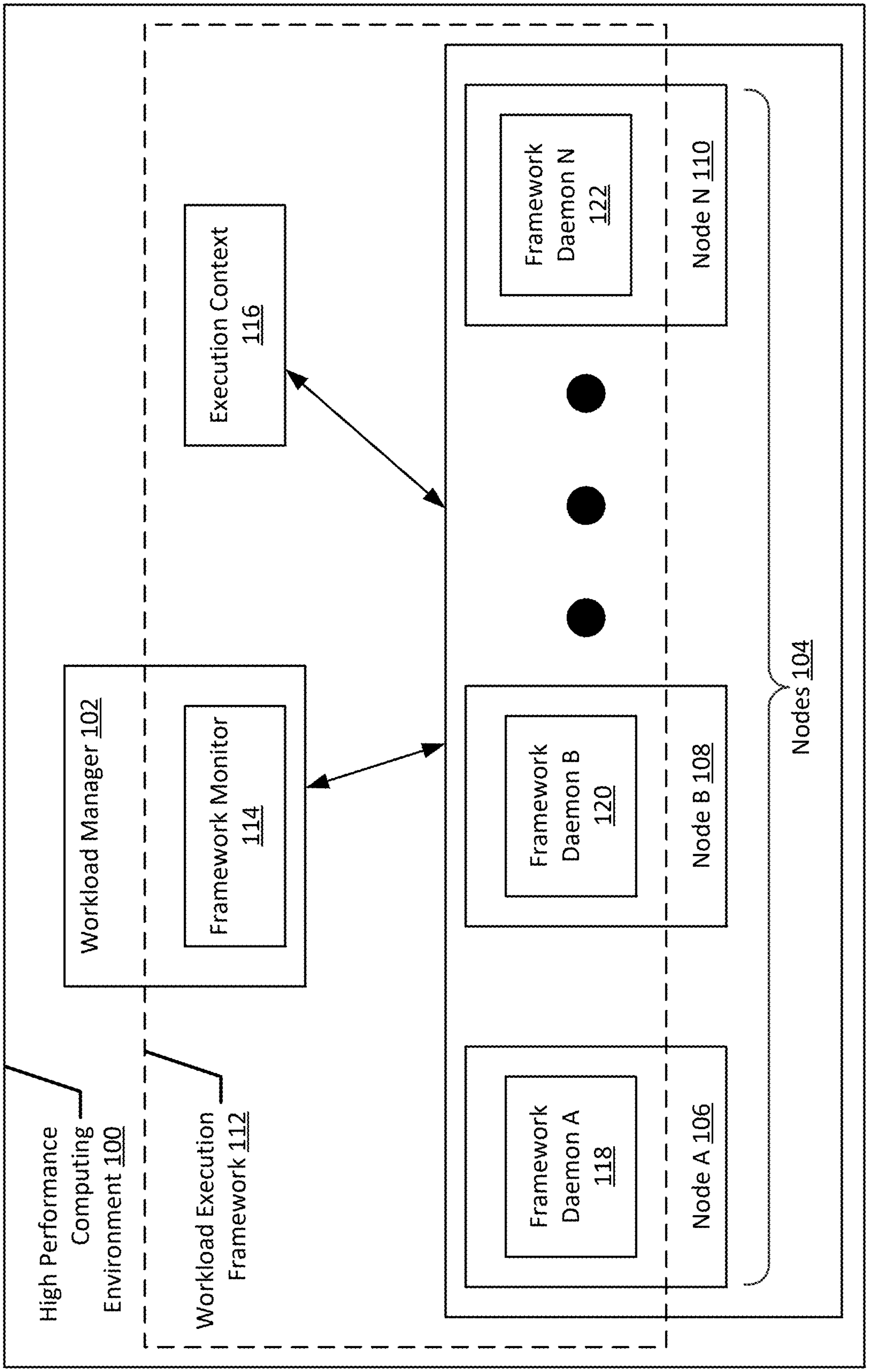
FIG. 1 illustrates a block diagram of an example system for implementing a workload execution framework in accordance with one or more examples disclosed herein.

High performance computing (HPC) workloads, workloads executed in a cloud computing environment, and many other types of workloads often include any number of workload portions (e.g., pre-determined portions of the overall workload) which may be executed on any number of nodes (e.g., computing devices) deployed in an HPC environment (e.g., a datacenter, a cloud environment, any other type of HPC environment). As an example, an HPC environment may include large numbers of heterogeneous nodes (e.g., thousands, tens of thousands), which may have differing capabilities in regards to various resources (e.g., compute resources, network resources, accelerator resources (e.g., graphics processing units (GPUs)), storage resources, any other type of accelerators). In such an HPC environment, to execute a workload may require a scheduler, workload manager, and the like that allocates resources (e.g., nodes) and schedules the various workload portions across all or any portion of the nodes of the HPC environment. A workload may be any set of operations, actions, processes, or any other activities to be performed in an HPC environment by nodes included therein.

However, certain problems may arise in an HPC environment that prevent and/or reduce efficient execution of workloads. One such problem is that various portions of the workload that are to be executed are often statically preassigned to nodes of the HPC environment. Such static assignments often fail to account for the differing performance capabilities of nodes in an HPC environment and/or differing rates at which execution of workload portions may be completed. Such static assignment of workload portions may cause a portion of the nodes that have completed their statically assigned workload portion to wait on the other nodes to complete their statically assigned workload portions before execution of the workload can continue and/or complete.

Another problem arises in the context of node failures. Node failures are often addressed using some form of a checkpoint and restart mechanism, where the progress of the workload must be checkpointed periodically (incurring time and resource overhead), and workloads must be restarted from the last checkpoint when a node of the set of nodes executing the workload fails.

Yet another problem that may arise in the context of workloads being executed by nodes in an HPC environment is that a workload may be divided into some number of workload portions, and execution of the workload may be delayed while a requisite number of nodes sufficient to execute the workload portions becomes available in the HPC environment.

In order to address at least the aforementioned problems, examples disclosed herein include techniques for providing a workload execution framework for workload execution in HPC environments that is capable of autoscaling, provides resiliency, and provides load balancing. In one or more examples, the workload execution framework includes: a framework monitor, which may, for example, be included in a workload manager of the HPC environment; a framework daemon that executes on each node of an HPC environment used to execute a workload; and a framework execution context, which may be included in a shared memory/storage device accessible to each of the nodes and that stores information related to execution units (e.g., workload portions) into which a workload has been divided prior to execution.

In one or more examples, prior to execution of a workload in an HPC environment, the workload may be divided into any number of execution units. In one or more examples, an execution unit is any portion of a workload that may be executed by a node. As an example, for a workload that includes performing sparse matrix multiplication, an execution unit may include one of the matrix rows that is to be multiplied. In one or more examples, an execution unit is uniquely identified in the shared memory within the set of execution units. As an example, each execution unit may be numbered, have a unique identifier, etc.

In one or more examples, the execution context may be stored may be any form of computer storage that is accessible to the nodes of an HPC environment that will execute the workload by executing the execution units, such as, for example, a fabric attached storage device that each node is configured to access, a shared memory pool that each node is configured to access, a network attached storage device that each node is configured to access, etc. The execution context may be stored in any other form of computer storage without departing from the scope of examples disclosed herein. The execution context may include a listing of the execution units along with the identifiers of the execution units. The execution context may include any other information relevant to the execution units without departing from the scope of examples disclosed herein. As an example, the execution context may include a table that lists a set of numbered execution units, and that includes a field for an identifier of a node that executes the execution unit (discussed further below).

In one or more examples, when a workload is to be executed in an HPC environment, a workload manager may be configured to assign at least some portion of the nodes of the HPC environment for executing the workload. However, in one or more examples, the execution units into which a workload is divided are not statically assigned to the nodes. Instead, in one or more examples, the nodes assigned for workload execution are configured to claim execution units, execute the claimed execution units, and then claim any remaining unexecuted execution units, and any node may claim any execution unit. In one or more examples, such dynamic claiming of execution units provides the flexibility for the nodes to continue workload execution even in the event of node failure (discussed further below), and to scale the nodes (e.g., increase the number of nodes, decrease the number of nodes, replace failed nodes) as needed. The number of nodes assigned to execute the workload may depend on any number of factors, such as, for example, the number nodes available at a given time for workload execution, the number of execution units into which the workload is pre-divided, service level agreement parameters such as execution time, or any other relevant factor. Other factors may influence the number of nodes assigned by a workload manager for execution of a workload without departing from the scope of examples disclosed herein.

The number of nodes assigned to execute a workload may be equal to the number of execution units, or may be less than the number of execution units. As an example, a workload may be divided into thirty execution units, and, based on a desired workload execution time, a workload manager may assign ten nodes to execute the workload. In one or more examples, a workload manager may assign less nodes to a workload based on the lack of present node availability in order to get the workload started, and may increase the number of nodes assigned to the workload as the workload is being executed and more nodes become available (e.g., in order to auto-scale to meet the workload execution needs, while not preventing start of workload execution to wait for more nodes to be available).

In one or more examples, after the pre-determined execution units of a workload are loaded into the execution context, and a set of nodes (e.g., one or more) are assigned by a workload manager to execute the workload, the nodes assigned to execute the workload may receive an indication (e.g., be signaled) to begin executing the workload.

In one or more examples, in response to such an indication, the nodes may execute a framework daemon (e.g., using an application programming interface (API)) that accesses the execution context. The framework daemon of each node may access the execution context, select one or more execution units to be executed by the respective node on which the framework daemon executes, and provide an identifier of the node associated with the one or more execution units selected for execution by the node.

As an example, for a given node, the framework daemon may select one execution unit for execution by the node, and populate a field associated with the execution unit in the execution context with an identifier of the node. The identifier of the node may be any form of information that uniquely identifies the node among the set of nodes executing the workload (e.g., a node number, a serial number, any other identifier that is unique among the nodes). In one or more examples, associating the identifier of a node with one or more execution units provides an indication, in the execution context, to each of the other nodes, that the node is executing the one or more execution units associated with the identifier of the node by the framework daemon.

In one or more examples, in the absence of other factors (e.g., node failure, scaling requests, discussed below), execution of the workload will proceed by each of the nodes assigned to execute the workload claiming at least one execution unit in the execution context, and executing the execution unit. In one or more examples, once a node has completed execution of its claimed execution unit, the framework daemon of the node again accesses the execution context to determine whether there are any other execution units therein that have not yet been claimed for execution. In one or more examples, if there are one or more unclaimed execution units, the framework daemon of the node may claim one or more of the unclaimed execution units for execution by the node by, as described above, associating an identifier of the node with the one or more execution units to alert the other nodes that the node is executing the one or more execution units.

In one or more examples, if the framework daemon of a node determines that there are no remaining unclaimed execution units in the execution context, the node may enter a barrier state. In one or more examples, once all nodes have entered the barrier state, execution of the workload assigned to the nodes may be considered complete.

In one or more examples, having nodes claim execution units as they complete execution of previous workload units provides dynamic load balancing for workload execution, as nodes that may execute execution units more quickly may execute additional execution units of the workload. As an example, a set of nodes may be heterogeneous, with some nodes having more resources (e.g., GPUs, memory resources). As such, some nodes may execute execution units of a workload more quickly than other nodes assigned to execute the workload. In such scenarios, rather than completing a statically assigned portion of the workload, and then waiting while other nodes complete their respective statically assigned workload portions, a node with more resources that completes an execution unit may dynamically claim additional execution units to execute, thereby executing a larger portion of the workload than the nodes with less resources, thus providing implicit load balancing among the nodes.

In one or more examples, one or more nodes of the set of nodes assigned by a workload manager to execute a workload may fail. In one or more examples, the framework monitor of the workload execution framework may monitor the nodes assigned for execution of the workload. The framework monitor may, for example, execute as part of the workload manager, may be a separate computing device operatively connected to the workload manager, and/or may be part of a separate computing device operatively connected to the framework manager. The framework monitor may monitor the nodes of the framework to, among other possible monitoring tasks (discussed below), determine whether any node has failed.

As an example, the framework daemon executing on each node may be configured to provide a periodic heartbeat signal to the framework monitor as the workload is being executed. In one or more examples, if the heartbeat signal is not received from a node at an appropriate time, the framework monitor may determine that the node has failed. In one or more examples, in the event of a node failure, the framework monitor may be configured to provide a signal to the framework daemons executing on each of the other nodes that provides an indication that the failed node has failed.

In one or more examples, the various framework daemons may respond to the indication from the framework monitor by accessing the execution context, and attempting to remove the identifier of the failed node from any execution unit with which the failed node was associated and, accordingly, was executing. In one or more examples, although the framework daemon from each node may attempt such an action, only one will succeed, as, after the first framework daemon succeeds, the remaining framework daemons will not find an identifier of the failed node associate with any execution unit in the execution context. In one or more examples, removing the identifier associating the failed node with an execution unit has the effect of returning the execution unit to a state of being available for execution by any of the remaining non-failed nodes (e.g., as an unclaimed execution unit). Therefore, once one of the nodes completes the execution unit currently being executed by that node, the node may access the execution context, and see the execution unit that was previously being executed by the now-failed node as an unclaimed execution unit, and claim the execution for execution, as discussed above. Thus, even in the event of a node failure, execution of the workload may continue, providing resiliency for the workload execution.

In one or more examples, in the event of a node failure, the framework daemon of a node that successfully removed the association between an execution unit and the failed node in the execution context may be further configured to request resources to replace the failed node (e.g., another node) from the workload manager that assigned the nodes to execute the workload. If no additional nodes are available, as described above, execution of the workload may continue by the remaining non-failed nodes continuing to claim and execute execution units from the execution context. However, if resources (e.g., another node) are available to replace the failed node, the workload manager may respond to the request from the framework daemon by adding another node to the set of nodes executing the workload to replace the failed node, providing an additional measure of resiliency and failure recovery to the workload execution. In one or more examples, the new node added to the set of nodes is configured with a framework daemon (like the other nodes), and proceeds to access the execution context, and start the above-described process of claiming execution units for execution.

In one or more examples, the framework monitor may be configured to monitor execution of the workload by the set of nodes assigned to execute the workload by the workload manager. The framework monitor may monitor any aspect of the execution of the workload, including, but not limited to, how long execution units wait before execution, contention for resources among the set of nodes executing the workload, availability of resources in the HPC environment, estimated execution completion time, and/or any other aspect of workload execution by the nodes. Based on such monitoring, the framework monitor may make scaling requests to the workload manager that assigns resources to workloads in the HPC environment.

As an example, a framework monitor may monitor the execution of a workload and determine that the rate of execution of the execution units of the workload may result in the execution time for the workload exceeding the desired or planned execution time, and, in response, request from the workload manager additional nodes to be added to the set of nodes executing the workload, thereby increasing the execution speed for the workload, which may be referred to as an increase request.

As another example, the framework monitor may determine that one or more nodes of the set of nodes assigned to execute a workload have no more execution units to execute, and are thus idle, and, in response, send an indication to the workload manager that the one or more nodes may be relinquished from being assigned to the workload, and thus made available for executing other workloads, which may be referred to as a remove request.

Thus, in one or more examples, monitoring by the framework monitor of the execution of the workload on the set of nodes assigned to the workload may allow for automatic scaling of the use of resources in the HPC environment by adding and/or removing nodes as needed to meet workload execution goals while not having unused nodes remain idle.

Certain examples of this disclosure may address certain problems that arise in the context of workload execution in an HPC environment due to static assignment of workload portions to resources of the HPC environment, such as, for example, lack of dynamic load balancing among nodes after execution begins, lack of ability of workload managers to address scenarios in which resources fail, lack of ability for scaling of resources to meet workload execution needs while also not having assigned resources remain idle.

These problems, and others, may be addressed by examples disclosed herein that provide a workload execution framework allows nodes assigned to execute a workload to claim execution units into which the workload is divided to be executed by the nodes, claim additional execution units after completing execution of previous execution units, disassociating execution units from failed nodes so that they may be re-executed by other nodes, requesting node replacement from a workload manager in the event of node failure, and auto-scaling of resources of an HPC environment to meet workload execution needs by monitoring workload execution by a framework monitor.

FIG. 1 illustrates a block diagram of an example system for implementing a workload execution framework in accordance with one or more examples of this disclosure. The system may include a high performance computing (HPC) environment 100. The HPC environment 100 may include a workload manager 102 and any number of nodes 104 (shown in FIG. 1 as node A 106, node B 108, and node N 110). The HPC environment may also include a workload execution framework 112. The workload execution framework 112 may include an execution context 116, a framework monitor 114 (which may be included as part of the workload manager 102), and any number of framework daemons (e.g., framework daemon A 118, framework daemon B 120, framework daemon N 122) executing on respective nodes (e.g., node A 106, node B 108, node N 110). Each of these components is described below.

In one or more examples, the HPC environment 100 is any collection of resources for executing workloads. As such, the HPC environment 100 may include any amount of compute resources (e.g., as any number of nodes such as 106, 108, 110, collectively nodes 104), any amount of network resources (not shown), and any amount of storage resources (not shown), and any amount of other resources, devices, components, and the like (e.g., the workload manager 102) that facilitate workload execution.

The HPC environment 100 may be deployed in a cloud computing environment (e.g., public cloud, private cloud, hybrid cloud), a datacenter environment, or any other computing environment that includes the aforementioned resources. Resources of the HPC environment 100 may be located at the same physical location, or may be distributed among any number of separate physical locations, which may or may not change over time.

Figure 5:
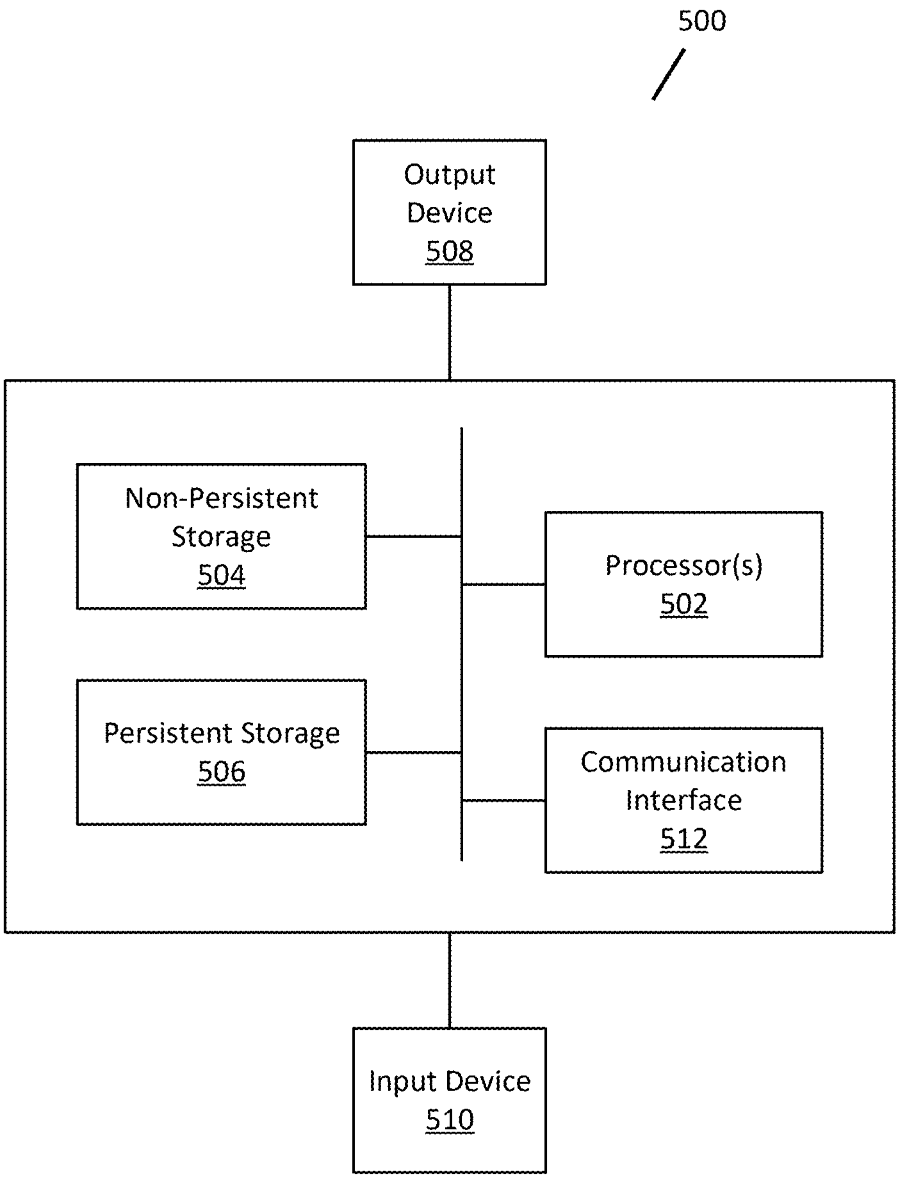
FIG. 5 illustrates a block diagram of a computing device, in accordance with one or more examples disclosed herein.

In one or more examples, the HPC environment 100 includes any number of nodes 104 (e.g., node A 106, node B 108, node N 110). In one or more examples, a node (e.g., node A 106, node B 108, node N 110) is a computing device. In one or more examples, as used herein, a computing device, such as any of the nodes 106, 108 and 110, may be any single computing device, a set of computing devices, a portion of one or more computing devices, or any other physical, virtual, and/or logical grouping of computing resources. One example of a computing device is shown in FIG. 5, and described below.

Examples of computing devices include, but are not limited to, a server (e.g., a blade-server in a blade-server chassis, a rack server in a rack, a desktop server, any other type of server device), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, any other type of storage device), a network device (e.g., switch, router, multi-layer switch, any other type of network device), a virtual machine, a virtualized computing environment, a logical container (e.g., for one or more applications), a container pod, an Internet of Things (IoT) device, an array of nodes of computing resources, a supercomputing device, a data center or any portion thereof, and/or any other type of computing device with the aforementioned requirements.

In one or more examples, any or all the aforementioned examples may be combined to create a system of such devices, or may be partitioned into separate logical devices, which may collectively be referred to as a computing device. Other types of computing devices may be used without departing from the scope of examples described herein, such as, for example, the computing device shown in FIG. 5 and described below. The HPC environment 100 may include any number and/or type of such nodes (e.g., node A 106, node B 108, node N 110) in any arrangement and/or configuration without departing from the scope of examples disclosed herein.

In one or more examples, the storage and/or memory of a computing device or system of computing devices (e.g., node A 106, node B 108, node N 110) may be and/or include one or more data repositories for storing any number of data structures storing any amount of data (e.g., information). In one or more examples, a data repository is any type of storage unit and/or device (e.g., a file system, database, collection of tables, RAM, hard disk drive, solid state drive, and/or any other storage mechanism or medium) for storing data. Further, the data repository may include multiple different storage units and/or devices. The multiple different storage units and/or devices may or may not be of the same type or located at the same physical location.

In one or more examples, any storage and/or memory of a computing device or system of computing devices, and/or network devices, may be considered, in whole or in part, as non-transitory computer readable mediums storing software and/or firmware, which, when executed by one or more processors, cause the one or more processors to perform operations in accordance with one or more examples disclosed herein.

The HPC environment 100 may include any number of nodes 104, any number of which may be individually or collectively considered a computing device, as used herein. All or any portion of the computing devices may be the same type or be different types of computing devices.

In one or more examples, the HPC environment 100 includes the workload manager 102. In one or more examples, the workload manager 102 is all or any portion of a computing device (described above). In one or more examples, the workload manager 102 is configured to manage, at least in part, deployment and execution of workloads in the HPC environment 100. As such, in one or more examples, the workload manager 102 is configured to allocate any number of nodes (e.g., node A 106, node B 108, node N 110) for executing a given workload, as well as configuring, setting up, provisioning, or otherwise making available any other portions of the HPC environment 100 (e.g., network resources, storage resources, any other type of resources) that may be required for execution of a workload.

In one or more examples, the workload manager is operatively connected to each of the nodes 104 (e.g., node A 106, node B 108, node N 110) of the HPC environment 100. In one or more examples, when a workload is to be executed in the HPC environment 100, the workload manager 102 may be configured to assign a number of nodes (e.g., the nodes 104) for executing the workload. The number of nodes assigned to execute the workload may depend on any number of factors, such as, for example, the number nodes available at a given time for workload execution, the number of execution units into which the workload is pre-divided, service level agreement parameters such as execution time, and/or any other relevant factor. Other factors may influence the number of nodes assigned by the workload manager 102 for execution of a workload without departing from the scope of examples disclosed herein.

In one or more examples, the workload execution framework 112 is deployed within the HPC environment 100. In one or more examples, the workload execution framework 112 is a collection of components that includes the framework monitor 114, any number of framework daemons (e.g., 118, 120, 122), and the execution context 116, each of which are described below. As shown in FIG. 1, the workload execution framework 112 is represented by the dashed line box that encompasses the aforementioned collection of components that includes the framework monitor 114, any number of framework daemons (e.g., 118, 120, 122), and the execution context 116. While the workload execution framework 112 encompasses the aforementioned components, it may not fully encompass devices that include such components. As an example, the workload execution framework 112 may include the framework monitor 114, but not the workload manager 102 that includes the framework monitor 114 beyond the framework monitor 114. As another example, the workload execution framework 112 may include the framework daemons 118, 120, and 122, but not the remainder of their respective nodes 106, 106, 122 outside the framework monitors. In one or more examples, the workload execution framework 112 facilitates execution of workloads according to examples disclosed herein. As such, the various components of the workload execution framework 112 operate in conjunction with one another to provide workload execution that is resilient (e.g., able to handle node failures), load-balancing, and automatically scalable.

In one or more examples, prior to execution of a workload in the HPC environment 100 using the workload execution framework 112, the workload may be divided into any number of execution units. In one or more examples, an execution unit is any portion of a workload that may be executed by a node (e.g., node A 106, node B 108, node N 110) of the HPC environment 100. As an example, for a workload that includes performing a number of operations as separate processes, an execution unit may include one of the processes. In one or more examples, an execution unit is uniquely identified within the set of execution units. As an example, each execution unit may be numbered, have a unique identifier, or may be uniquely identified within the set of execution units using any other appropriate technique for distinguishing one item from other items in a set of items. In one or more examples, the execution units into which the workload is divided are not statically assigned to nodes prior to workload execution.

In one or more examples, the workload execution framework 112 includes the execution context 116. In one or more examples, the execution context 116 is any component that is configured to store information, and that is operatively connected, at least, to the nodes 104 that are allocated by the workload manager 102 for executing a workload. In one or more examples, the execution context may be any form of storage accessible to the nodes 104 of the HPC environment 100 that will execute the workload by executing the execution units, such as, for example, a fabric attached storage device that each node is configured to access, a shared memory pool that each node is configured to access, a network attached storage device that each node is configured to access, and/or any other form of persistent or non-persistent memory or storage accessible by each of the nodes 104.

In one or more examples, the execution context 116 is configured to store information related to the aforementioned execution units into which a workload has been divided (but not pre-assigned to any nodes prior to execution of the workload by the nodes 104 of the HPC environment 100). The execution context 116 may include a listing of the execution units along with the identifiers of the execution units, or may include a listing of the identifiers. The execution context may include any other information relevant to the execution units without departing from the scope of examples disclosed herein. As an example, the execution context may include a table that lists a set of numbered execution units, and includes a field for an identifier of a node that executes the execution unit (discussed further below). An example of the execution context 116 is discussed further in the description of FIG. 2, below.

In one or more examples, the workload execution framework 112 includes any number of framework daemons (e.g., 118, 120, 122). In one or more examples, a framework daemon is any hardware, software, and/or firmware that is configured on or as part of, and/or executes on one of the nodes 104 allocated by the workload manager 102 for execution of a workload. In one or more examples, a framework daemon (e.g., 118, 120, 122) is configured to use one or more APIs to interact with other components of the HPC environment 100 and the workload execution framework 112, such as, for example, the execution context 116, the framework monitor 114, and/or the workload manager 102.

In one or more examples, the framework daemons (e.g., 118, 120, 122) are configured to receive an indication that workload execution is to begin, and, in response to such an indication, access the execution context 116 to claim one or more execution units the be executed by the respective node on which the framework daemon is deployed. The operations and actions performed by a framework daemon (e.g., 118, 120, 122) are discussed further below in the descriptions of FIG. 3 and FIG. 4.

In one or more examples, the workload execution framework 112 includes the framework monitor 114. In one or more examples, the framework monitor 114 is all or any portion of a computing device (described above). As an example, the framework monitor 114 may be a portion of the workload manager 102 (e.g., as shown in FIG. 1). Alternatively, the framework monitor 114 may be separate from and operatively connected to the workload manager 102. In one or more examples, the framework monitor 114 is operatively connected to each of the nodes 104 and, thereby, to each of the framework daemons (e.g., 118, 120, 122) executing thereon.

In one or more examples, the framework monitor 114 is configured to monitor the execution of the workload on the nodes 104. As such, in one or more examples, the framework monitor 114 may be configured to monitor the nodes 104 for any node failures. As an example, the framework daemon (e.g., 118, 120, 122) executing on each node may be configured to provide a periodic heartbeat signal to the framework monitor 114 as the workload is being executed. In one or more examples, if the heartbeat signal is not received from a node at an appropriate time, the framework monitor 114 may determine that the node has failed. Monitoring for node failure by the framework monitor 114 is discussed further below in the description of FIG. 4.

In one or more examples, the framework monitor 114 may be configured to monitor execution of the workload by the set of nodes 104 assigned to execute the workload by the workload manager 102. The framework monitor 114 may monitor any aspect of the execution of the workload, including, but not limited to, how long execution units wait before execution, contention for resources among the set of nodes 104 executing the workload, availability of resources in the HPC environment 100, estimated execution completion time, and/or any other relevant aspect of workload execution on the nodes. Based on such monitoring, the framework monitor 114 may make scaling requests to the workload manager 102 that assigns resources to workloads in the HPC environment 100.

As an example, the framework monitor 114 may monitor the execution of a workload and determine that the rate of execution of the execution units of the workload may result in the execution time for the workload exceeding the desired or planned execution time, and, in response, make a scaling request to the workload manager 102 for additional nodes to be added to the set of nodes 104 executing the workload (which may be referred to as an increase request), thereby increasing the execution speed for the workload.

As another example, the framework monitor 114 may determine that one or more nodes of the set of nodes 104 assigned to execute a workload have no more execution units to execute, and are thus idle, and, in response, send an indication to the workload manager 102 that the one or more nodes may be relinquished from being assigned to the workload (which may be referred to as a remove request), and thus made available for executing other workloads.

Thus, in one or more examples, monitoring by the framework monitor 114 of the execution of the workload on the set of nodes 104 assigned to the workload may allow for automatic scaling of the use of resources in the HPC environment 100 by adding and/or removing nodes as needed to meet workload execution goals while not having unused nodes remain idle.

While FIG. 1 shows a particular configuration of components, other configurations may be used without departing from the scope of examples described herein. For example, although FIG. 1 shows certain components as part of the same device, any of the components may be grouped in sets of one or more components which may exist and execute as part of any number of separate and operatively connected devices. As another example, a single component may be configured to perform all, or any portion of the functionality performed by the all or any portion of the components shown in FIG. 1. As another example, for the sake of clarity, only certain components of the HPC environment 100 are shown. However, the HPC environment 100 may include any number of additional components (e.g., network devices, storage devices, management devices, etc.) without departing from the scope of examples disclosed herein. Accordingly, examples disclosed herein should not be limited to the configuration of components shown in FIG. 1.

Figure 2:
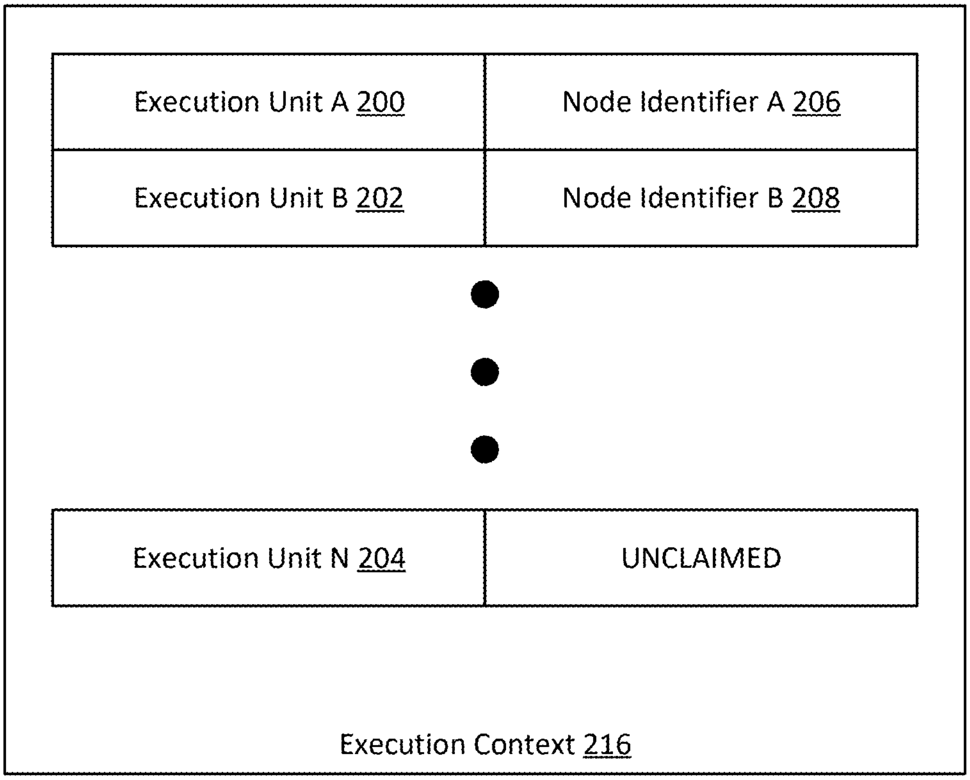
FIG. 2 illustrates a block diagram of an example execution context 116 in accordance with one or more examples disclosed herein.

FIG. 2 illustrates a block diagram of an example execution context 216 in accordance with one or more examples disclosed herein. As shown in FIG. 2, the execution context 216 includes a representation of any number of execution units (e.g., execution unit A 200, execution unit B 202, execution unit N 204), and any number of node identifiers (e.g., node identifier A 206, node identifier B 208). Each of these components is described below.

In one or more examples, the execution context 216 is one example of the execution context 116 shown in FIG. 1 and described above. As such, the execution context 216 is any memory or storage device configured to store information of any type in any form. The execution context may be part of a computing device (described above), or may be storage and/or memory accessible to computing devices (e.g., the nodes 104 shown in FIG. 1).

In one or more examples, the execution context 216 is configured to store, at least temporarily, a data structure of any type that is capable of associating items of information with one another. In one or more examples, the data structure stored in the execution context 216 is configured to allow association of execution units of a workload with nodes (e.g., the nodes 104 shown in FIG. 1) that claim the execution units. In one or more examples, the nodes claim an execution unit by executing a framework daemon (e.g., framework daemon A 118, framework daemon B 120, framework daemon N 122 shown in FIG. 1), which accesses the execution context 216 to find execution units represented therein, and claims an execution unit for execution on the node of the framework daemon. In one or more examples, a framework daemon may claim an execution unit by associating a node identifier (e.g., 206, 208) of the node on which the framework daemon executes with an execution unit represented in the execution context 216.

As an example, for a given node, the framework daemon may select one execution unit for execution by the node, and populate a field associated with the execution unit (e.g., execution unit A 200, execution unit B 202, execution unit N 204) in the execution context with an identifier of the node (e.g., node identifier A 206, node identifier B 208). The identifier of the node (e.g., node identifier A 206, node identifier B 208) may be any form of information that uniquely identifies the node among the set of nodes executing the workload (e.g., a node number, a serial number). In one or more examples, associating the identifier of a node with one or more execution units provides an indication, in the execution context 216, to each of the other nodes that the node is executing the one or more execution units associated with the identifier of the node by the framework daemon.

In one or more examples, some portion of the execution units in the execution context 216 may be unclaimed, such as execution unit N 206 shown in FIG. 2. In one or more examples, an execution unit may be unclaimed in a variety of scenarios. As an example, when a workload is divided into more execution units than there are nodes allocated for execution of the workload, after each node claims an execution unit, some portion of the execution units will remain as unclaimed execution units that will be claimed by nodes as the nodes complete execution of previously claimed execution units. As another example, an execution unit that was being executed by a node that fails may return to a state of being unclaimed (see description of FIG. 4, below).

In one or more examples, although not shown in FIG. 2, the execution context 1216 may be configured to represent, in the data structure of execution units and associated nodes executing the execution units, an indication that an execution unit has already been executed, and/or to remove from the execution context 216 representation of execution units upon completion of the execution unit by a node. In one or more examples, execution of a workload may be considered complete when all execution units that were initially included in the execution context 216 are executed by the nodes assigned to execute the workload.

Figure 3:
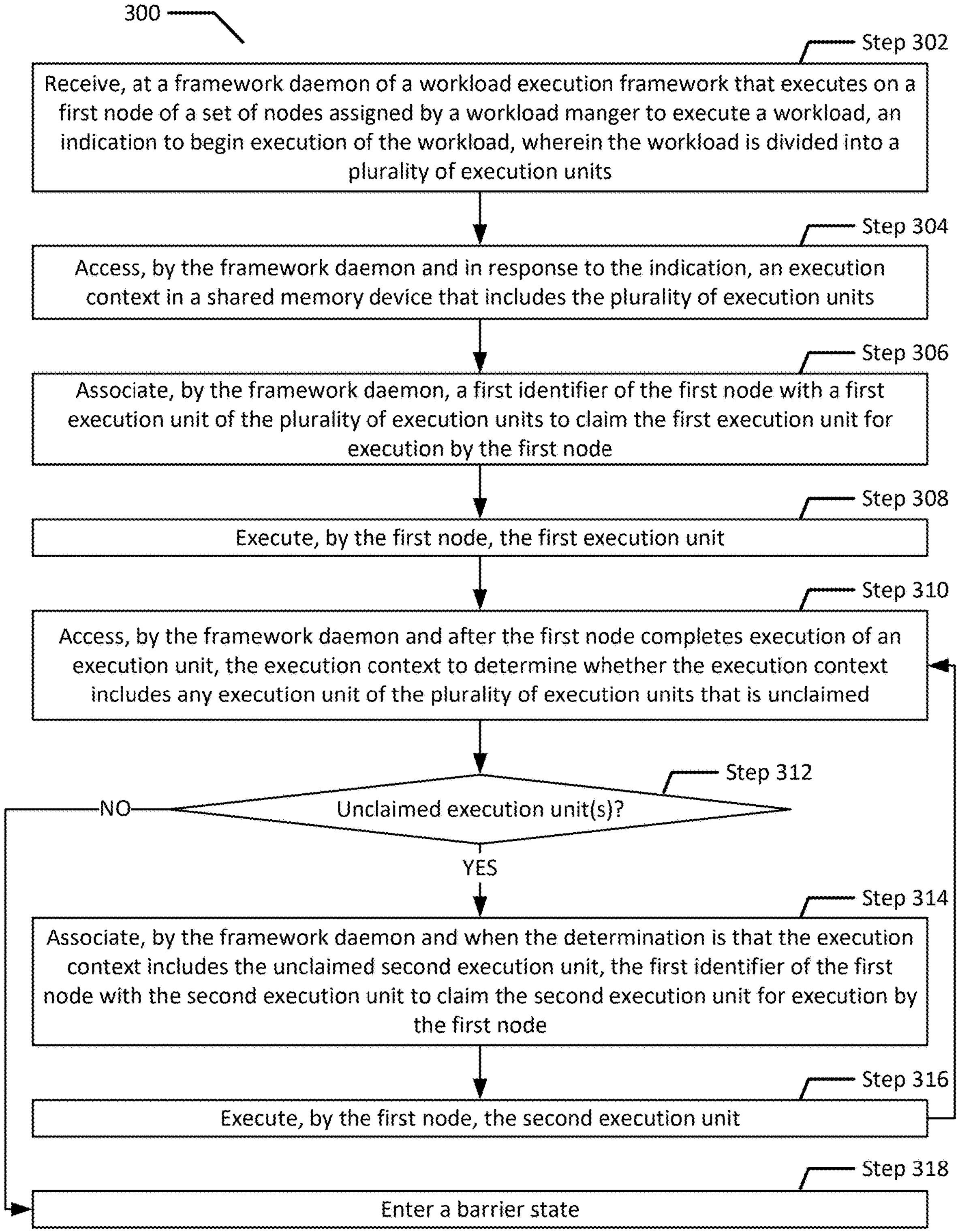
FIG. 3 illustrates an overview of an example method for executing a workload in a HPC environment using a workload execution framework in accordance with one or more examples disclosed herein.

FIG. 3 illustrates an overview of an example method 300 for executing a workload in a HPC environment using a workload execution framework in accordance with one or more examples disclosed herein. The method 300 may be performed, at least in part, by a workload execution framework (e.g., the workload execution framework 112 shown in FIG. 1), or any component of a workload execution framework (e.g., the framework monitor 114 of FIG. 1, any framework daemon (e.g., 118, 120, 122) of FIG. 1, the execution context 116 of FIG. 1), and/or the workload manager 102 of FIG. 1.

Figure 4:
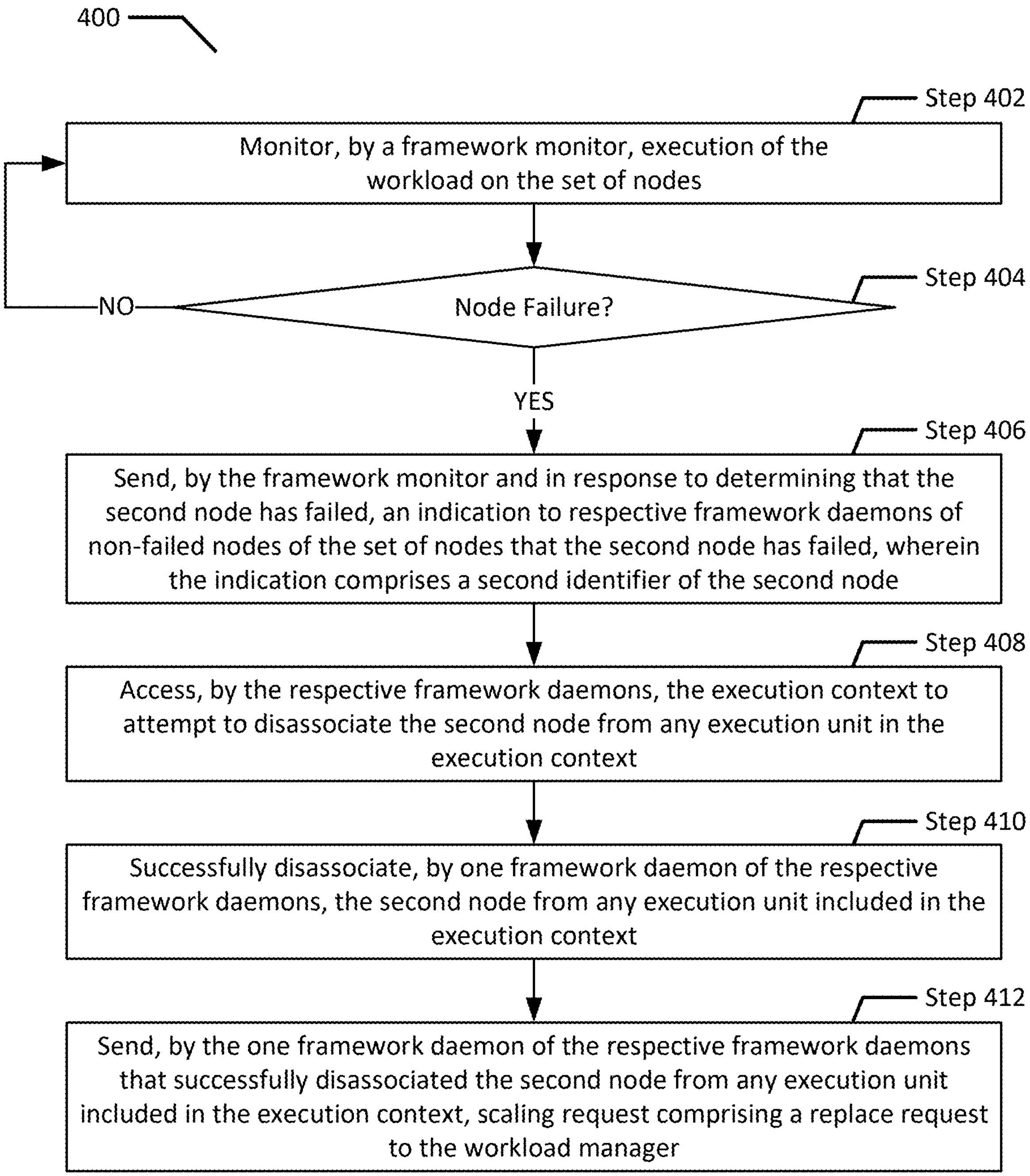
FIG. 4 illustrates an overview of an example method for executing a workload in a HPC environment using a workload execution framework in the event of a node failure in accordance with one or more examples disclosed herein.

While the various steps in the flowchart shown in FIG. 3 are presented and described sequentially, some or all of the steps may be executed in different orders, some or all of the steps may be combined or omitted, and some or all of the steps may be executed in parallel with other steps of FIG. 3 and/or FIG. 4.

In Step 302, the method 300 includes receiving, at a framework daemon (e.g., the framework daemons 118, 120, 122 of FIG. 1) of a workload execution framework (e.g., the workload execution framework 112 of FIG. 1) that executes on a first node of a set of nodes assigned by a workload manger to execute a workload, an indication to begin execution of the workload. In one or more examples, the workload is divided into a plurality of execution units prior to execution of the workload, and the execution units are not statically assigned to nodes prior to the respective framework daemons of the nodes receiving an indication to begin workload execution. In one or more examples, the indication is received from any source capable of providing an indication that workload execution is to begin (e.g., a workload manager, a framework monitor, a user device, and/or any other source). In one or more examples, such an indication is received at each framework daemon of each node allocated to execute the workload. The indication may take any form capable of signaling to the nodes to begin workload execution. As an example, the indication may be sent as one or more network packets over a network to the framework daemons of the nodes that are to execute the workload.

In Step 304, the method 300 includes accessing, by the framework daemon and in response to the indication, an execution context (e.g., the execution context 116 of FIG. 1, the execution context 216 FIG. 2) that includes representations of the plurality of execution units. As an example, the framework daemon may access the execution context via an operative network connection between the node on which the framework daemon executes and the execution context. In one or more examples, as discussed above in the descriptions of FIG. 1 and FIG. 2, the execution context is any storage and or memory that is operatively connected to the set of nodes allocated to execute the workload. In one or more examples, the execution context includes a data structure that includes a representation of the execution units into which the workload is divided prior to beginning execution of the workload. In one or more examples, the data structure is configured to include a field associated with each execution unit of the workload in which an identifier of a node may be stored, which may have an effect of claiming the execution unit as being executed by the node identified by the node identifier.

In Step 306, the method 300 includes associating, by the framework daemon, a first identifier of the first node with a first execution unit of the plurality of execution units in the execution context to claim the first execution unit for execution by the first node. In one or more examples, a framework daemon may associate the node on which the framework daemon executes with an execution unit by populating the field in the execution context associated with the execution unit with an identifier of the node. An identifier of a node may be any item of information that uniquely identifies a node among a set of nodes allocated (e.g., by a workload manager) for execution of a workload.

In Step 308, the method 300 includes executing, by the first node, the first execution unit. In one or more examples, executing an execution unit on a node includes obtaining any information needed to execute the execution unit, and then executing the execution unit. As an example, if the workload is to perform sparse matric multiplication, an execution unit may include multiplying a row of a matrix. As such, executing the execution unit may include obtaining the row of the matrix and the element with which the row is to be multiplied, thereby enabling the node to perform the multiplication.

In Step 310, the method 300 includes accessing, by the framework daemon and after the first node completes execution of an execution unit, the execution context to determine whether the execution context includes any execution unit of the plurality of execution units that is unclaimed. In one or more examples, the execution context includes all execution units of the workload that are to be executed. In one or more examples, an execution unit may be either claimed by a node for execution by being associated with a node identifier, or be unclaimed. An execution unit may be unclaimed if no node has yet claimed the execution unit for execution, or if a node that claimed the execution unit for execution failed prior to completion of execution of the execution unit, and the execution unit was returned to an unclaimed state (discussed further in the description of FIG. 4, below).

In Step 312, the method 300 includes making a determination as to whether the execution context includes any unclaimed execution units. In one or more examples, the determination is made by a framework daemon executing on a node that has completed execution of an execution unit of a workload. In one or more examples, the determination is made by the framework daemon assessing the execution context to determine whether any execution units included and/or represented therein are unclaimed (e.g., not claimed by another node). In one or more examples, if there are no remaining unclaimed execution units in the execution context, the method proceeds to Step 318. In one or more examples, if there are one or more unclaimed execution units, the method proceeds to Step 314.

In Step 314, the method include associating, by the framework daemon and when the determination in Step 312 is that the execution context includes the unclaimed second execution unit, the first identifier of the first node with the second execution unit to claim the second execution unit for execution by the first node. In one or more examples, a framework daemon may associate the node on which the framework daemon executes with the second execution unit by populating the field in the execution context associated with the second execution unit with the identifier of the node. An identifier of a node may be any item of information that uniquely identifies the node among the set of nodes allocated (e.g., by a workload manager) for execution of a workload. In one or more examples, allowing nodes to claim additional execution units for execution after completing execution of other execution units allows for execution of the workload to be implicitly load balanced, as nodes that have more resources and are able to complete execution of execution units more quickly, or that claimed an execution unit that took less time to execute, may claim additional execution units for execution.

In Step 316, the method 300 includes executing, by the first node, the second execution unit. In one or more examples, executing an execution unit on a node includes obtaining any information needed to execute the execution unit, and then executing the execution unit. As an example, if the workload is to perform a process of a set of related processes, an execution unit may include one or the processes to be executed. As such, executing the execution unit may include obtaining whatever information is needed to execute the process, and then executing the process. In one or more examples, after Step 316, the method may return to Step 310, where the framework daemon of a node that completes execution of an execution unit accesses the execution context to determine whether any unclaimed execution units remain therein.

In Step 318, the method includes entering a barrier state. In one or more examples, a barrier state is a state at which nodes have no more execution units to execute, and may be used, for example, as a form of synchronization. In one or more examples, a workload being executed by a set of nodes may be considered complete when each node of the set of nodes assigned to execute the workload has entered a barrier state.

FIG. 4 illustrates an overview of an example method 400 for executing a workload in a HPC environment using a workload execution framework in the event of a node failure in accordance with one or more examples disclosed herein. The method 400 may be performed, at least in part, by a workload execution framework (e.g., the workload execution framework 112 shown in FIG. 1), or any component of a workload execution framework (e.g., the framework monitor 114 of FIG. 1, any framework daemon (e.g., 118, 120, 122) of FIG. 1, the execution context 116 of FIG. 1), and/or the workload manager 102 of FIG. 1.

While the various steps in the flowchart shown in FIG. 4 are presented and described sequentially, some or all of the steps may be executed in different orders, some or all of the steps may be combined or omitted, and some or all of the steps may be executed in parallel with other steps of FIG. 3 and/or FIG. 4.

In Step 402, the method 400 includes monitoring, by a framework monitor (e.g., the framework monitor 114 of FIG. 1), execution of the workload on the set of nodes (e.g., the nodes 104 of FIG. 1). In one or more examples, the framework monitor is configured to monitor the execution of the workload to observe various characteristics of the workload execution, including, but not limited to, the state of the nodes (e.g., failed or not failed). The monitoring may occur using an operative connection between the framework monitor and each of the respective nodes.

In Step 404, the method 400 includes determining, by the framework monitor, whether any node has failed. In one or more examples, the framework monitor may determine that a node has failed using any appropriate technique for detecting node failure. As an example, framework daemons on the nodes may be configured to send a periodic heartbeat signal to the framework monitor, and not receiving the heartbeat signal from a node at an appropriate time may indicate a node failure. As another example, the framework monitor may be configured to periodically ping the nodes, and the lack of a reply may indicate a node failure. As another example, the framework monitor may be configured to periodically access the nodes, and an access failure may indicate a node failure. Other techniques for ascertaining whether a node has failed may be used without departing from the scope of examples disclosed herein. In one or more examples, if the framework monitor does not determine that a node has failed, the method returns to Step 402, and the framework monitor continues monitoring the nodes during execution of the workload. In one or more examples, if the framework monitor determines that a node has failed, the method proceeds to Step 406.

In Step 406, the method 400 includes sending, by the framework monitor and in response to determining that the second node has failed, an indication to respective framework daemons of non-failed nodes of the set of nodes that the second node has failed. In one or more examples, the indication comprises a second identifier of the second node (e.g., the failed node). The indication may take any form capable of conveying to the framework daemons that a node has failed. In one or more examples, the indication includes, at least, an indication that a node has failed, and an identifier of the failed node. In one or more examples, the identifier of the failed node is the same as the identifier of the node that the failed node is configured to use when claiming an execution unit in the execution context. Additionally, or alternatively, in one or more examples, the identifier of the node in the indication received at the framework daemons from the framework monitor is not the same as the identifier used by the failed node to claim execution units, but the framework daemons are configured to use the identifier received in the indication to determine the identifier that the failed node uses to claim execution units.

In Step 408, the method includes accessing, by the respective framework daemons, the execution context to attempt to disassociate the second node from any execution unit in the execution context. In one or more examples, in response to the indication received in Step 406, each of the framework daemons is configured to attempt to access the execution context and disassociate from the failed node any execution units therein that are associated with the failed node (e.g., via an association of the identifier of the failed node). As an example, the framework daemons may be configured to use an API to access the execution context, and assess the claimed execution units therein to determine whether an identifier of the failed node is associated with any of the claimed execution units.

In Step 410, the method 400 includes successfully disassociating, by one framework daemon of the respective framework daemons, the second node from any execution unit included in the execution context. In one or more examples, although each framework daemon attempts to disassociate the failed node from any execution units, only one will succeed, as after one succeeds, the failed node will no longer be associated with any execution units. In one or more examples, successfully disassociating a failed node from an execution unit includes removing the identifier of the failed node from the execution context at any location in the execution context where the identifier of the failed node is associated with an execution unit. In one or more examples, disassociating an execution unit from an association with a failed node (e.g., by removing the identifier of the failed node from being associated with the execution unit) returns the execution unit to an unclaimed state, so that another node may claim the execution unit for execution.

In Step 412, the method 400 includes sending, by the one framework daemon of the respective framework daemons that successfully disassociated the second node from any execution unit included in the execution context, a scaling a replace request to the workload manager, which, when sent in response to a node failure, may be referred to as a replace request. In one or more examples, a replace request is a request to replace a node in the set of nodes. As an example, the replace request may be a request to replace the second node of the set of nodes after the second node fails. In one or more examples, of the framework daemons is configured to attempt to disassociate the failed node from any execution units in the execution context in response to the indication received in Step 406, and further configured to, if successful at being the framework daemons that performs the disassociation, request a replacement node from the workload manager. In one or more examples, having only the successful framework daemon send the node replacement request to the workload manager prevents the workload manager from receiving redundant requests. In one or more examples, although not shown in FIG. 4, the workload manager may respond to the request by attempting to replace the node. In one or more examples, if there are no nodes available in the HPC environment, the workload manager may not replace the node. In such a scenario, workload execution may continue anyway, as the remaining, non-failed nodes assigned to execute the workload will continue to execute execution units, and then check for unclaimed execution units when execution of previous execution units completes (see description of FIG. 3, above). In one or more examples, the workload manager may respond to the node replace request by allocating an additional node to replace the failed node in the set of nodes assigned to execute the workload, either at the time the request is received, or at a later time when an additional node in the HPC environment becomes available. Thus, examples described herein provide resiliency for workload execution by either automatically replacing failed nodes, or by allowing the non-failed nodes to continue workload execution even if a node fails.

FIG. 5 illustrates a block diagram of a computing device, in accordance with one or more examples of this disclosure. As discussed above, examples described herein may be implemented using computing devices. For example, the all or any portion of the components shown in FIG. 1 (e.g., the workload manager 102, the framework monitor 114, the framework daemons (e.g., 118, 120, 122), the nodes 104, the execution context 116) and the execution context 216 may be implemented, at least in part, using one or more computing devices, and all or any portion of the methods shown in FIG. 3 and FIG. 4 may be performed using one or more computing devices, such as the computing device 500.

In one or more examples, a computing device (e.g., the computing device 500) is any device, portion of a device, or any set of devices capable of electronically processing instructions and may include, but is not limited to, any of the following: one or more processors (e.g. components that include circuitry) (e.g., the processor 502), memory (e.g., random access memory (RAM)) (not shown), input and output device(s) (e.g., the non-persistent storage 506), non-volatile storage hardware (e.g., solid-state drives (SSDs), persistent memory (Pmem) devices, hard disk drives (HDDs) (not shown)), one or more physical interfaces (e.g., network ports, storage ports) (e.g., the persistent storage 506), any number of other hardware components (not shown), and/or any combination thereof. As used herein, a processor may be any component that can be configured to execute operations, processes, threads, and the like. Examples of a processor include, but are not limited to, central processing units (CPUs), multi-core CPUs, application-specific integrated circuits (ASICs), accelerators (e.g., graphics processing units (GPUs)), and field programmable gate arrays (FPGAs).

The computing device 500 may include a communication interface 512 (e.g., Bluetooth interface, infrared interface, network interface, optical interface, any other type of communication interface), input devices 510, output devices 508, and numerous other elements (not shown) and functionalities. Each of these components is described below.

In one or more examples, the computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. The processor 502 may be an application specific integrated circuit (ASIC), a graphics processing unit (GPU), a data processing unit (DPU), a tensor processing units (TPU), an associative processing unit (APU), a vision processing units (VPU), a quantum processing units (QPU), and/or various other processing units that use special purpose hardware (e.g., field programmable gate arrays (FPGAs), System-on-a-Chips (SOCs), digital signal processors (DSPs)). Although only one processor 502 is shown in FIG. 5, the computing device 500 may include any number of processors without departing from the scope of examples disclosed herein.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. In one or more examples, the computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multimodal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission of wired or wireless communications using wired and/or wireless transceivers of any type and/or technology. Examples include, but are not limited to, those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, FPGAs, CPUs, and/or other suitable electronic circuits), and/or can include and/or be implemented using computer software, firmware, or any combination thereof, to perform the various operations described herein. In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Figure 6:
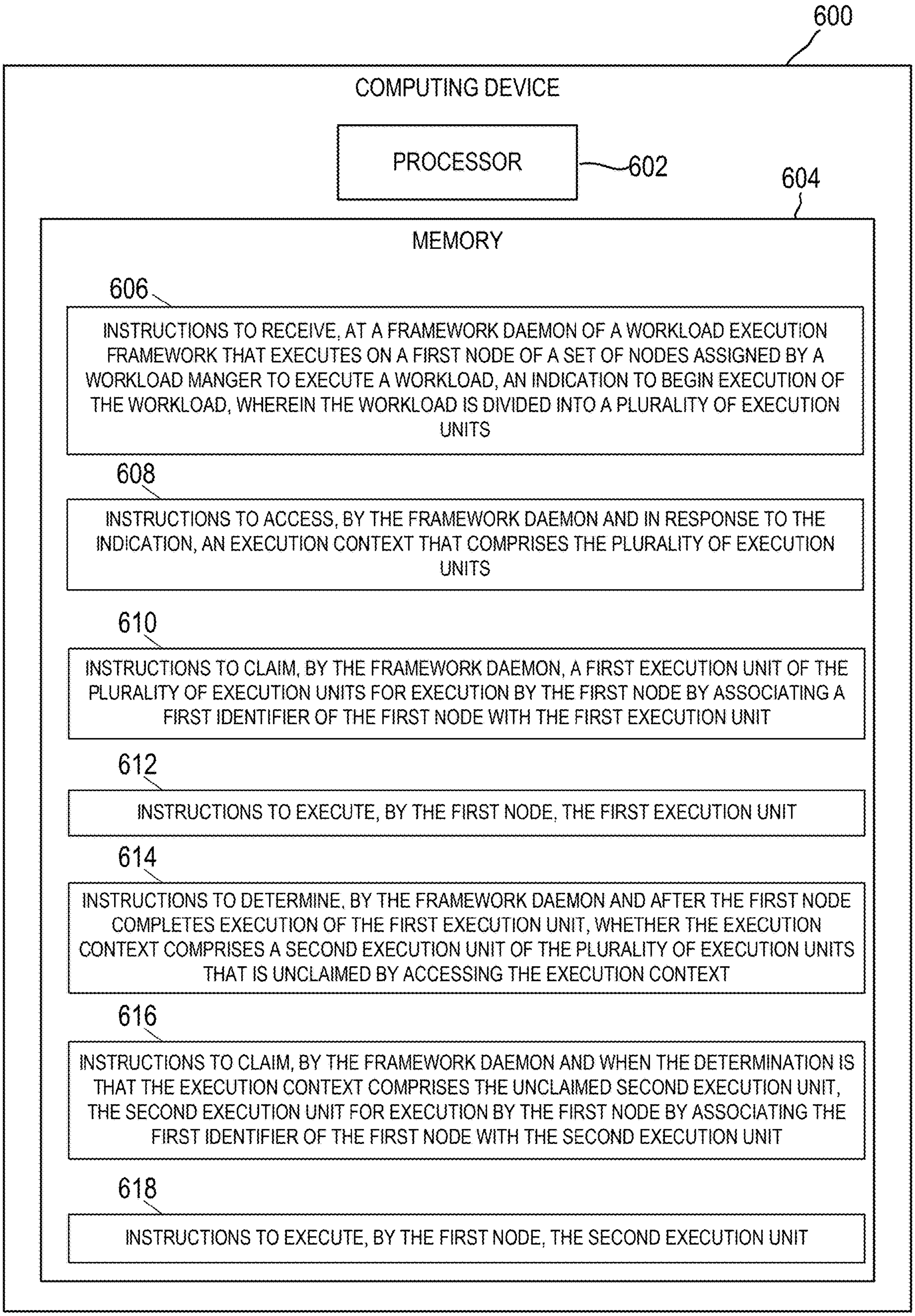
FIG. 6 illustrates a block diagram of a computing device, in accordance with one or more examples disclosed herein.

FIG. 6 illustrates a block diagram of a computing device 600, in accordance with one or more examples disclosed herein. The computing device 600 is an example of the computing device 500 previously described above in the description of FIG. 5. As discussed above in the descriptions of FIG. 1, FIG. 2, FIG. 3, FIG. 4, and FIG. 5, the computing device 600 may be used to implement all or any portion of the various components shown in FIG. 1 and FIG. 2, and described above, such as, for example, the workload manager 102 of FIG. 1, the framework monitor 114 of the workload manager 102 of FIG. 1, the execution context 116 of FIG. 1, the node 106 of FIG. 1, the framework daemon 118 of the node A 116 of FIG. 1, the node B of FIG. 1, the framework daemon 120 of the node B 108 of FIG. 1, the node N 110 of FIG. 1, the framework daemon N 122 of the node N 110 of FIG. 1, and/or the execution context 216 of FIG. 2 (or any component therein).

The computing device 600 may include one or more processors 602 and memory 604. The memory 604 may include a non-transitory computer-readable medium that stores programming for execution by one or more of the one or more processors 702. In this implementation, one or more modules within the computing device 600 may be partially or wholly embodied as software for performing any functionality described in this disclosure. The computing device 600 may be, for example, configured to perform the method 300 shown in FIG. 3 and described above, by executing instructions included in the memory 604 and executed by the one or more processors 602.

For example, the memory 604 may include instructions 606 to receive, at a framework daemon of a workload execution framework that executes on a first node of a set of nodes assigned by a workload manger to execute a workload, an indication to begin execution of the workload, wherein the workload is divided into a plurality of execution units (e.g., as described above in reference to Step 302 of FIG. 3).

The memory 604 may also include instructions 608 to access, by the framework daemon and in response to the indication, an execution context that comprises the plurality of execution units (e.g., as described above in reference to Step 304 of FIG. 3).

The memory 604 may also include instructions 610 to claim, by the framework daemon, a first execution unit of the plurality of execution units for execution by the first node by associating a first identifier of the first node with the first execution unit (e.g., as described above in reference to Step 306 of FIG. 3).

The memory 604 may also include instructions 612 to execute, by the first node, the first execution unit (e.g., as described above in reference to Step 308 of FIG. 3).

The memory 604 may also include instructions 614 to determine, by the framework daemon and after the first node completes execution of the first execution unit, whether the execution context comprises a second execution unit of the plurality of execution units that is unclaimed by accessing the execution context (e.g., as described above in reference to Step 310 and Step 312 of FIG. 3).

The memory 604 may also include instructions 616 to claim, by the framework daemon and when the determination is that the execution context comprises the unclaimed second execution unit, the second execution unit for execution by the first node by associating the first identifier of the first node with the second execution unit (e.g., as described above in reference to Step 314 of FIG. 3).

The memory 604 may also include instructions 618 to execute, by the first node, the second execution unit (e.g., as described above in reference to Step 316 of FIG. 3).

In the above description, numerous details are set forth as examples of examples described herein. It will be understood by those skilled in the art (who also have the benefit of this disclosure) that one or more examples described herein may be practiced without these specific details, and that numerous variations or modifications may be possible without departing from the scope of the examples described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects and examples may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects of examples disclosed herein.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not included in a figure. A process may correspond to a method, a function, a procedure, a subroutine, a subprogram, and the like. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, and the like. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various examples described herein, may be equivalent to one or more same or similarly named and/or numbered components described with regard to any other figure. For brevity, descriptions of these components may not be repeated with regard to each figure. Thus, each and every example of the components of each figure is incorporated by reference and assumed to be optionally present within every other figure having one or more same or similarly named and/or numbered components. Additionally, in accordance with various examples described herein, any description of the components of a figure is to be interpreted as an optional example, which may be implemented in addition to, in conjunction with, or in place of the examples described with regard to a corresponding one or more same or similarly named and/or numbered component in any other figure.

Throughout the application, ordinal numbers (e.g., first, second, third) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While examples discussed herein have been described with respect to a limited number of examples, those skilled in the art, having the benefit of this disclosure, will appreciate that other examples can be devised which do not depart from the scope of examples as disclosed herein. Accordingly, the scope of examples described herein should be limited only by the attached claims.

What is claimed is:

1. A system, comprising:

one or more processors; and one or more non-transitory computer readable media storing instructions which, when executed by the one or more processors, cause the one or more processors to:

populate, by a workload manager of a workload execution framework, an execution context with a plurality of execution units into which a workload is divided, wherein:

after being populated by the workload manager, the execution context comprises a data structure comprising a plurality of entries, each including a respective execution unit of the plurality of execution units, the execution context is separate from and accessible by a set of nodes assigned by the workload manager to execute the workload, and the execution units are initially not assigned to any node of the set of nodes;

receive, at a framework daemon of the workload execution framework that executes on a first node of the set of nodes, an indication to begin execution of the workload;

access, by the framework daemon and in response to the indication, the execution context that comprises the plurality of execution units;

claim, by the framework daemon, a first execution unit of the plurality of execution units for execution by the first node by adding a first identifier of the first node to a first entry of the plurality of entries in the execution context that includes the first execution unit, wherein adding the first identifier to the first entry that includes the first execution unit indicates to other nodes of the set of nodes that the first execution unit is a claimed execution unit;

execute, by the first node, the first execution unit;

determine, by the framework daemon and after the first node completes execution of the first execution unit, whether the execution context comprises a second execution unit of the plurality of execution units that is an unclaimed execution unit by accessing the execution context, wherein the second execution unit of the plurality of execution units is determined to be the unclaimed execution unit when a second entry of the plurality of entries of the execution context that includes the second execution unit does not include a node identifier associated with the second execution unit;

claim, by the framework daemon and when the determination is that the execution context comprises the unclaimed second execution unit, the second execution unit for execution by the first node by adding the first identifier of the first node to the second entry that includes the second execution unit; and execute, by the first node, the second execution unit.

2. The system of claim 1, wherein execution of the instructions further causes the one or more processors to:

determine, by a framework monitor of the workload execution framework, that a second node of the set of nodes that is executing the workload has failed;

send, by the framework monitor and in response to determining that the second node has failed, a second indication to respective framework daemons of non-failed nodes of the set of nodes that the second node has failed, wherein the second indication comprises a second identifier of the second node; and successfully disassociate, by one framework daemon of the respective framework daemons and in response to the second indication, the second node from any execution unit comprised in the execution context.

3. The system of claim 2, wherein execution of the instructions further causes the one or more processors to:

send, by the one framework daemon of the respective framework daemons that successfully disassociated the second node from any execution unit comprised in the execution context, a scaling request comprising a replace request to the workload manager.

4. The system of claim 1, wherein execution of the workload is complete when each node of the set of nodes has entered a barrier state and each execution unit of the plurality of execution units has been executed by the set of nodes.

5. The system of claim 1, wherein the workload execution framework further comprises a framework monitor, and execution of the instructions further causes the one or more processors to:

monitor, by the framework monitor, execution of the workload on the set of nodes; and adjust, based on the monitoring, a number of nodes comprised in the set of nodes by sending a scaling request to the workload manager.

6. The system of claim 5, wherein the scaling request comprises an increase request.

7. The system of claim 5, wherein the scaling request comprises a remove request.

8. A computer-implemented method, comprising:

populating, by a workload manager of a workload execution framework, an execution context with a plurality of execution units into which a workload is divided, wherein:

after being populated by the workload manager, the execution context comprises a data structure comprising a plurality of entries, each including a respective execution unit of the plurality of execution units, the execution context is separate from and accessible by a set of nodes assigned by the workload manager to execute the workload, and the execution units are initially not assigned to any node of the set of nodes;

receiving, at a framework daemon of the workload execution framework that executes on a first node of the set of nodes, an indication to begin execution of the workload;

accessing, by the framework daemon and in response to the indication, the execution context that comprises the plurality of execution units;

claiming, by the framework daemon, a first execution unit of the plurality of execution units for execution by the first node by adding a first identifier of the first node to a first entry of the plurality of entries in the execution context that includes the first execution unit, wherein adding the first identifier to the first entry that includes the first execution unit indicates to other nodes of the set of nodes that the first execution unit is a claimed execution unit;

executing, by the first node, the first execution unit;

determining, by the framework daemon and after the first node completes execution of the first execution unit, whether the execution context comprises a second execution unit of the plurality of execution units that is an unclaimed execution unit by accessing the execution context, wherein the second execution unit of the plurality of execution units is determined to be the unclaimed execution unit when a second entry of the plurality of entries of the execution context that includes the second execution unit does not include a node identifier associated with the second execution unit;

claiming, by the framework daemon and when the determination is that the execution context comprises the unclaimed second execution unit, the second execution unit for execution by the first node by adding the first identifier of the first node to the second entry that includes the second execution unit; and executing, by the first node, the second execution unit.

9. The computer-implemented method of claim 8, further comprising:

determining, by a framework monitor of the workload execution framework, that a second node of the set of nodes that is executing the workload has failed;

sending, by the framework monitor and in response to determining that the second node has failed, a second indication to respective framework daemons of non-failed nodes of the set of nodes that the second node has failed, wherein the second indication comprises a second identifier of the second node; and successfully disassociating, by one framework daemon of the respective framework daemons and in response to the second indication, the second node from any execution unit comprised in the execution context.

10. The computer-implemented method of claim 9, further comprising:

sending, by the one framework daemon of the respective framework daemons that successfully disassociated the second node from any execution unit comprised in the execution context, a scaling request comprising a replace request to the workload manager.

11. The computer-implemented method of claim 8, wherein execution of the workload is complete when each node of the set of nodes has entered a barrier state and each execution unit of the plurality of execution units has been executed by the set of nodes.

12. The computer-implemented method of claim 8, wherein the workload execution framework further comprises a framework monitor, and the computer-implemented method further comprises:

monitoring, by the framework monitor, execution of the workload on the set of nodes; and adjusting, based on the monitoring, a number of nodes comprised in the set of nodes by sending a scaling request to the workload manager.

13. The computer-implemented method of claim 12, wherein the scaling request comprises an increase request.

14. The computer-implemented method of claim 12, wherein the scaling request comprises a remove request.

15. A non-transitory computer-readable medium storing programming for execution by one or more processors, the programming comprising instructions to:

populate, by a workload manager of a workload execution framework, an execution context with a plurality of execution units into which a workload is divided, wherein:

after being populated by the workload manager, the execution context comprises a data structure comprising a plurality of entries, each including a respective execution unit of the plurality of execution units, the execution context is separate from and accessible by a set of nodes assigned by the workload manager to execute the workload, and the execution units are initially not assigned to any node of the set of nodes;

receive, at a framework daemon of the workload execution framework that executes on a first node of the set of nodes, an indication to begin execution of the workload;

access, by the framework daemon and in response to the indication, the execution context that comprises the plurality of execution units;

claim, by the framework daemon, a first execution unit of the plurality of execution units for execution by the first node by adding a first identifier of the first node to a first entry of the plurality of entries in the execution context that includes the first execution unit;

execute, by the first node, the first execution unit;

determine, by the framework daemon and after the first node completes execution of the first execution unit, whether the execution context comprises a second execution unit of the plurality of execution units that is an unclaimed execution unit by accessing the execution context, wherein the second execution unit of the plurality of execution units is determined to be the unclaimed execution unit when a second entry of the plurality of entries of the execution context that includes the second execution unit does not include a node identifier associated with the second execution unit;

claim, by the framework daemon and when the determination is that the execution context comprises the unclaimed second execution unit, the second execution unit for execution by the first node by adding the first identifier of the first node to the second entry that includes the second execution unit; and execute, by the first node, the second execution unit.

16. The non-transitory computer-readable medium of claim 15, wherein the programming comprises further instructions to:

determine, by a framework monitor of the workload execution framework, that a second node of the set of nodes that is executing the workload has failed;

send, by the framework monitor and in response to determining that the second node has failed, a second indication to respective framework daemons of non-failed nodes of the set of nodes that the second node has failed, wherein the second indication comprises a second identifier of the second node; and successfully disassociate, by one framework daemon of the respective framework daemons and in response to the second indication, the second node from any execution unit comprised in the execution context.

17. The non-transitory computer-readable medium of claim 16, wherein the programming comprises further instructions to:

send, by the one framework daemon of the respective framework daemons that successfully disassociated the second node from any execution unit comprised in the execution context, a scaling request comprising a replace request to the workload manager.

18. The non-transitory computer-readable medium of claim 15, wherein execution of the workload is complete when each node of the set of nodes has entered a barrier state and each execution unit of the plurality of execution units has been executed by the set of nodes.

19. The non-transitory computer-readable medium of claim 15, wherein the programming comprises further instructions to:

monitor, by a framework monitor, execution of the workload on the set of nodes; and adjust, based on the monitoring, a number of nodes comprised in the set of nodes by sending a scaling request to the workload manager.

20. The non-transitory computer-readable medium of claim 19, wherein the scaling request comprises at least one of:

an increase request; and a remove request.

* * * * *